(12) United States Patent
Okur et al.

(10) Patent No.: US 10,835,803 B2
(45) Date of Patent: Nov. 17, 2020

(54) OBJECT TRAJECTORY SIMULATION

(71) Applicant: RAPSODO PTE. LTD., Singapore (SG)

(72) Inventors: Batuhan Okur, Singapore (SG); Boyi Zhang, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 74 days.

(21) Appl. No.: 16/357,079

(22) Filed: Mar. 18, 2019

(65) Prior Publication Data
US 2020/0298092 A1    Sep. 24, 2020

(51) Int. Cl.

| | |
|---|---|
| A63B 71/06 | (2006.01) |
| A63B 24/00 | (2006.01) |
| G01S 13/58 | (2006.01) |
| G06T 7/73 | (2017.01) |
| G06T 7/246 | (2017.01) |
| G06K 9/00 | (2006.01) |
| G06T 11/60 | (2006.01) |
| A63B 102/32 | (2015.01) |
| A63B 102/18 | (2015.01) |

(Continued)

(52) U.S. Cl.
CPC ...... *A63B 71/0622* (2013.01); *A63B 24/0021* (2013.01); *G01S 13/58* (2013.01); *G06K 9/00624* (2013.01); *G06T 7/248* (2017.01); *G06T 7/74* (2017.01); *G06T 11/60* (2013.01); *A63B 2024/0034* (2013.01); *A63B 2102/02* (2015.10); *A63B 2102/18* (2015.10); *A63B 2102/20* (2015.10); *A63B 2102/32* (2015.10); *A63B 2220/40* (2013.01); *A63B 2220/807* (2013.01); *A63B 2220/89* (2013.01); *G06T 2207/10044* (2013.01); *G06T 2207/20056* (2013.01); *G06T 2207/20084* (2013.01); *G06T 2207/30204* (2013.01); *G06T 2207/30224* (2013.01); *G06T 2207/30241* (2013.01)

(58) Field of Classification Search
CPC . A63B 71/0622; A63B 24/0021; G01S 13/58; G06T 7/74; G06T 7/248; G06T 11/60; G06K 9/00624
See application file for complete search history.

(56) References Cited

U.S. PATENT DOCUMENTS

| | | | | |
|---|---|---|---|---|
| 5,926,780 | A | * | 7/1999 | Fox ............... A63B 24/0021 473/140 |
| 10,409,363 | B1 | * | 9/2019 | Kudirka ............ A63F 13/573 |
| 2002/0045999 | A1 | * | 4/2002 | Bollweg ............ F41G 3/2683 702/158 |

* cited by examiner

*Primary Examiner* — Asghar H Bilgrami
(74) *Attorney, Agent, or Firm* — Maschoff Brennan

(57) ABSTRACT

A method may include receiving a group of images taken by a camera over time in an environment, in which the camera may be oriented within the environment to capture images of an object in a substantially same direction as a launch direction of the object, and the group of images including a first image and a second image. The method may further include: identifying a first position of the object in the first image; identifying a second position of the object in the second image; generating a flight vector based on the first position of the object and the second position of the object; and determining one or more flight parameters using the flight vector. Additionally, the method may include: generating a simulated trajectory of the object based on the flight parameters; and providing the simulated trajectory of the object for presentation in a graphical user interface.

20 Claims, 7 Drawing Sheets

(51) Int. Cl.
*A63B 102/02* (2015.01)
*A63B 102/20* (2015.01)

OBJECT TRAJECTORY SIMULATION

FIELD

The application relates generally to object trajectory simulation.

BACKGROUND

Objects sometimes may travel through the air. It may be difficult to simulate how the object travels through the air and thus a landing position of the object, particularly in situations where one or more flight parameters of the object may be difficult to ascertain. Some computer systems may attempt to determine one or more flight parameters of an object but lead to widely inaccurate flight simulations of the object due to limited and/or erroneous flight parameter inputs for some computer systems.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure discuss various operations performed in a method, system, and/or computer-readable medium. The operations may include receiving a plurality of images taken by a camera over time in an environment, the camera oriented within the environment to capture images of an object in a substantially same direction as a launch direction of the object, the plurality of images including a first image and a second image. The operations may further include: identifying a first position of the object in the first image; identifying a second position of the objection in the second image; generating a flight vector based on respective positions of the object in the first and second images; and determining one or more flight parameters using the flight vector. Additionally, the operations may include: generating a simulated trajectory of the object based on the flight parameters; and providing the simulated trajectory of the object for presentation in a graphical user interface.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
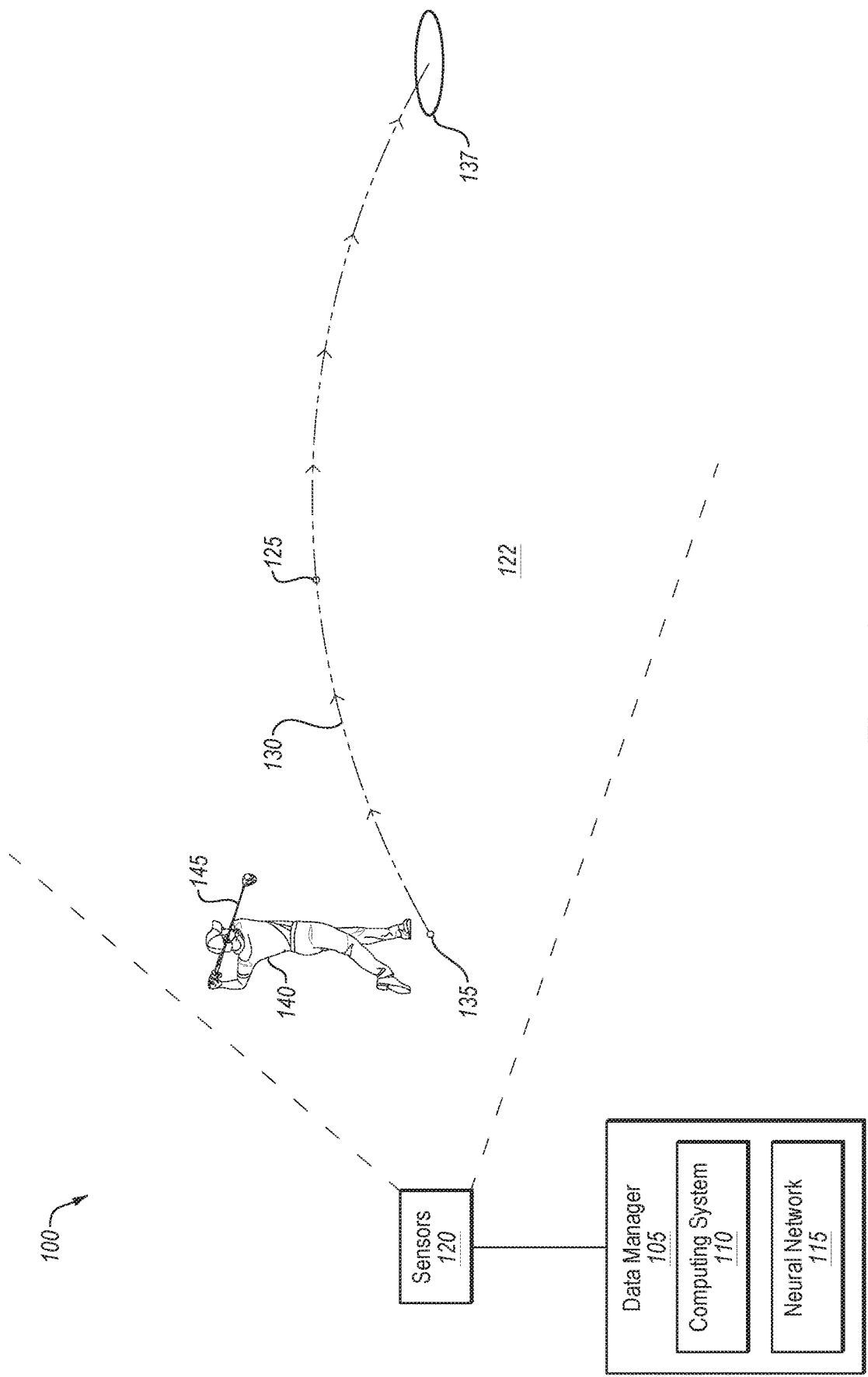
FIG. 1 illustrates an example environment to simulate a trajectory of an object.

Many technologies and fields may benefit from imaging analysis. For example, in sports, imaging analysis may help identify whether: a tennis serve was on the line, a foot was inbounds, a ball touched the ground, illegal contact was made, a baseball strike actually crossed home plate, etc. Such examples of imaging analysis may be used in review processes of events after they occur, now common in a variety of sports. Additionally, imaging analysis and/or other sensor detection may be used in real-time processes. For example, high speed cameras may illustrate as an event occurs and sometimes in seemingly slow-motion: a balloon popping, lightning striking, or an explosion detonating. In other scenarios, radar sensors may be used to determine a speed of an object as an event occurs, e.g., a baseball pitch, a tennis serve, a tee-shot, etc. Additionally, imaging analysis and/or other sensor detection may be used in predictive processes. Such predictive processes may be difficult and/or computationally intense because in addition to accurately gathering real-time data, simulated data may be generated based on the real-time data. Thus, in some conventional methods and systems, predicting or simulating a flight trajectory of an object may be unduly limited or unreliable. Smartphone hardware, low-cost hardware, and/or slow frame rate speeds of some cameras may further exacerbate the example problematic limitations and reliability of other methods and systems.

For example, some other methods and systems may endeavor to simulate a flight trajectory of an object. However, these other methods and systems may extrapolate flight parameters based on captured images and compare the extrapolated flight parameters with sensor data, such as radar data. The sensor data may then be used to modify the extrapolated flight parameters to account for error and/or poor image quality. Problems with these other systems may include: 1) extrapolation error; 2) over-reliance on radar data to remedy extrapolation error; and 3) over-reliance on high resolution and/or high frame rate imaging. Myriad other drawbacks with conventional systems exist.

Aspects of the present disclosure address these and other problems with conventional methods and systems by providing a new, software-based approach that improves accuracy of the simulated trajectory and associated flight parameters while also allowing for system flexibility in a variety of devices, such as a client device, a measuring device, or other suitable device.

Thus, according to one or more embodiments of the present disclosure, a device may be placed behind a player to acquire imaging data and deduce flight parameters of a launched object such as speed, spin axis, rate of spin, launch angle, launch direction, etc. Additionally or alternatively, radar data may be used to deduce one or more of the flight parameters. Additionally or alternatively, markings on the object and associated rotational blur may be used to deduce one or more of the flight parameters. Additionally or alternatively, a rolling shutter of a camera may be used to deduce one or more of the flight parameters. In these or other embodiments, the flight parameters may be input into a flight model to determine a simulated a trajectory of the object. Additionally or alternatively, one or more of the flight parameters may be determined as the simulated trajectory is modeled.

In some embodiments of the present disclosure, club identification may be employed. For example, using image processing and image recognition techniques, a club may be identified and/or presented at a display. The club may be used to launch the object. In these or other embodiments of the present disclosure, flight mapping data may be generated and/or presented at a display. The flight mapping data may include, relative to an environment for launching the object, one or more of global positioning system (GPS) coordinates, compass data, accelerometer data, target data, and satellite or flyby images. Additionally or alternatively, the simulated trajectory may be combined with one or more aspects of the flight mapping data, e.g., for presentation at a display. In these or other embodiments of the present disclosure, the display may be a display of a client device and/or a display of another device, such as a TV, monitor, or other suitable display. Such displays may be network-connected displays and may be used in location-specific entertainment, competitions, etc.

FIG. 1 illustrates an example environment 100 to simulate a trajectory 130 of an object 125. The environment 100 is arranged in accordance with at least one embodiment of the present disclosure. As illustrated, the environment 100 may include a data manager 105 having a computing system 110 and a neural network 115, sensors 120 having a field of view 122, the object 125, the trajectory 130, a starting point 135, a target region 137, a player 140, and a club 145.

In some embodiments, the data manager 105 may direct operations of the computing system 110 and/or the neural network 115. Additionally or alternatively, the data manager 105 may facilitate communication between the system 110 and the neural network 115. Additionally or alternatively, the data manager 105 may facilitate communication between the sensors 120 and any of the computing system 110 and the neural network 115.

In some embodiments, the data manager 105 may be part of a client device. Some examples of the client device may include a mobile phone, a smartphone, a tablet computer, a laptop computer, a desktop computer, a set-top box, a virtual-reality device, an augmented reality device, a wearable device, a connected device, a measurement device, etc.

Figure 5:
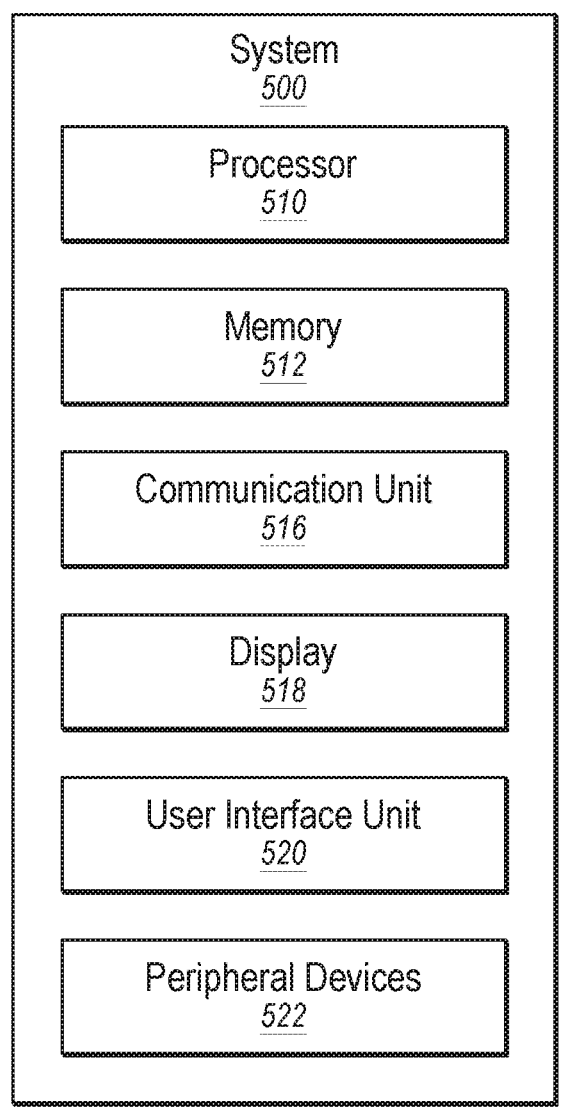
FIG. 5 illustrates a block diagram of an example computing system.

In some embodiments, the computing system 110 may include any computer system, such as the system 500 described in conjunction with FIG. 5. In these or other embodiments, the neural network 115 may include any learning-based mechanism. Examples of neural networks may include: perceptron, multilayer perceptron, feed forward, radial basis network, deep feed forward, recurrent neural network, long/short term memory, gated recurrent unit, auto encoder, variational auto encoder, denoising auto encoder, sparse auto encoder, any sequence-to-sequence model, shallow neural networks, markov chain, hopfield network, boltzmann machine, restricted boltzmann machine, deep belief network, deep convolutional network, convolutional neural network (e.g., VGG-16), deconvolutional network, deep convolutional inverse graphics network, modular neural network, generative adversarial network, liquid state machine, extreme learning machine, echo state network, recursive neural network, deep residual network, kohonen network, support vector machine, neural turing machine, etc.

The neural network 115 may receive data from one or more of the sensors 120. Any of the sensors 120 may be included as part of the client device or may be a device separate from the client device. In some embodiments, the field of view 122 may be a three-dimensional space in which the sensors 120 may image (e.g., in video mode or picture mode), sense indications of events, and/or obtain data. The sensors 120 may be positioned such that the field of view 122 includes the starting point 135 of the trajectory 130 and/or a portion of the environment 100 beyond the starting point 135. In these or other embodiments, the sensors 120 may be positioned such that the field of view 122 is aligned or approximately aligned with the starting point 135 and the target region 137.

The neural network 115 may use the data generated by one or more of the sensors 120 to learn during a training process (e.g., to populate one or more layers or neurons in the neural network 115). Additionally or alternatively, the neural network 115 may use the data generated by one or more of the sensors 120 to learn post-training (e.g., to re-populate one or more layers or neurons in the neural network 115 or to populate layers or neurons in response to changed circumstances in the environment 100).

For example, using data generated by one or more of the sensors 120, the neural network 115 may learn to identify the club 145 (e.g., after several, tens, hundreds, thousands, or millions of training shots). Training the neural network 115 to automatically identify the club 145 may include receiving data generated by one or more of the sensors 120 in which the data may correspond to images of the club 145 and/or other clubs of a variety of club types. Examples of different club types may include woods, irons, and hybrids. Additionally or alternatively, clubs of all types may include a club identifier such as a number or name, a shape, an outline, a material, an amount of reflectivity, a shaft, a face angle, a head measurement, etc. that may help to identify the club 145. As the neural network 115 receives more and more data corresponding to different clubs, the neural network 115 may increase in accuracy with respect to identification of the club 145. Additionally or alternatively, the neural network 115 may learn a repertoire of clubs that are specific to the player 140 (e.g., as available to the player 140, purchased by the player 140, and/or previously used by the player 140). Other examples including the neural network 115 are described with additional specificity in conjunction with FIG. 3.

In some embodiments, the sensors 120 may include: a camera; a radar sensor, an accelerometer, a gyroscope, or any other suitable sensor configured to sense changes in light, pixels, sound, motion, rotation, position, orientation, magnetization, acceleration, tilt, vibration, force, speed, color, wind, etc.

In some embodiments, the object 125 may include any projectile, for example, a golf ball, a baseball, a tennis ball, a kickball, a cricket ball, a shuttlecock, etc. Accordingly, the scope of the present disclosure may include a wide variety of sports and activities in which it may be desirable to simulate the trajectory 130 of an object 125. Although some of the figures and corresponding description may be associated with one or more example sports or activities, the scope of the present disclosure is not limited to those example sports or activities given the variety of applications herein contemplated.

In some embodiments, the trajectory 130 may include a path of travel of the object 125. In these or other embodiments, the sensors 120 may generate data that depicts the object 125 at various positions and/or orientations. Based on the generated data from the sensors 120 depicting the object 125 at various positions and/or orientations, the data manager 105 may determine one or more flight parameters of the object 125 to simulate the trajectory 130. Determining the flight parameters and trajectory 130 of the object 125 is discussed in greater detail in conjunction with FIGS. 2A, 2B, and 2C along with FIG. 3.

As referred to in the present disclosure, the starting point 135 may include a position of the object 125 at which there is detected a beginning of motion of the object 125 approximately along the trajectory 130. For example, the starting point 135 may include a position at which the object 125 is detected as having left a tee box, a launch area, or a starting area. Additionally or alternatively, the starting point 135 may include a position at which the object 125 is detected as being on the ground (e.g., on a playing surface, a tee, a court, a field, etc.). In these or other embodiments, the starting point 135 may include a position of the object 125 when stationary prior to a force being exerted against the object 125 to impart motion of the object 125 in a direction approximately along the trajectory 130. Thus, in some embodiments, the starting point 135 of the trajectory 130 may include the position of the object 125 at some point prior to, during, or after the object 125 is shot along the trajectory 130. Additionally or alternatively, the starting point 135 may correspond to global positioning system (GPS) coordinates, e.g., of a client device, a measurement device, a camera of the sensors 120, or any other suitable device configured to determine GPS coordinates and that may also be in proximity to the object 125 when stationary prior to launch. For example, a client device associated with the player 140 may, in turn, be positionally associated with the object 125 at time of impact for launching the object 125 along the trajectory 130.

In some embodiments, the target region 137 may correspond to a location on the ground (e.g., a court, a field, a playing surface, etc.). For example, the target region 137 may include an estimated area (e.g., circular, rectangular, or triangular area having some dimensional boundaries such as about two feet by two feet). In these or other embodiments, the target region 137 may include the estimated area at which the player 140 intends to place the object 125, e.g., a fairway, a bunker, a green, a fringe, a flag, a cup, a target (e.g., a colored target like in TopGolf® games), etc. Additionally or alternatively, the target region 137 may include an estimated point (e.g., a dot, an "X", or other symbol) that indicates a GPS coordinate on the ground. For example, the target region 137 may include an estimated GPS coordinate or pin-point location on the ground that corresponds to where the player 140 intends to place the object 125. Additionally or alternatively, the target region 137 may be selectable. For example, the player 140 may choose to select the target region 137 via the computing system 110. In another example, the target region 137 may be inferred based on the trajectory 130, e.g., via the computing system 110. In some embodiments, the object 125 need not arrive to or be placed at the target region 137. For example, the player 140 may intend to place the object 125, but a poor shot may put the object 125 at a different position than the target region 137. Thus, in some embodiments, the trajectory 130 may not end at the target region 137 in some cases, while in other cases, the trajectory 130 may end at the target region 137.

Modifications, additions, or omissions may be made to the environment 100 without departing from the scope of the present disclosure. For example, in some embodiments, the environment 100 may include any number of other components that may not be explicitly illustrated or described.

Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 2A:
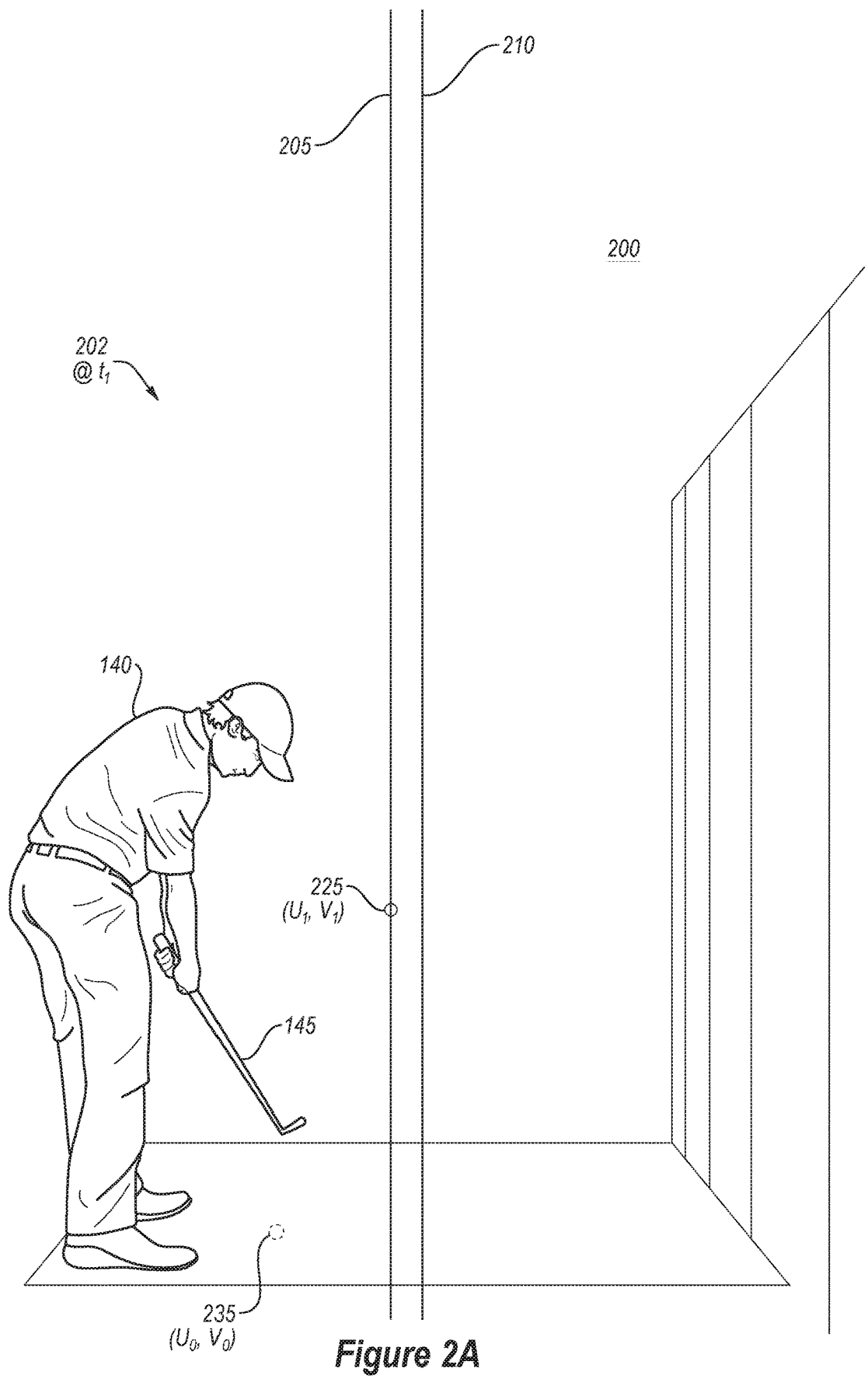
FIGS. 2A-2B respectively illustrate an example environment captured at different times in a first image and a second image.
Figure 2B:
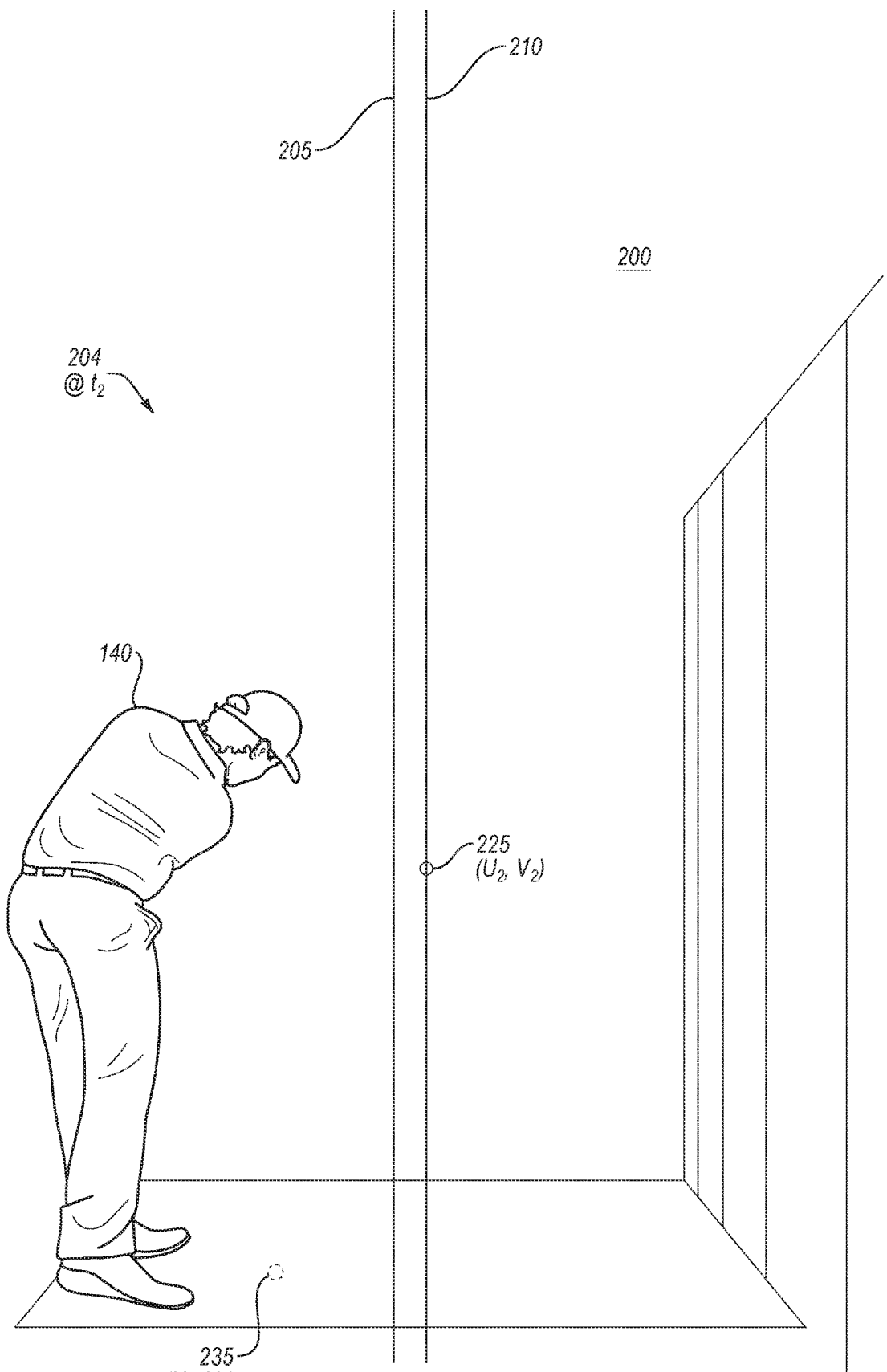

FIGS. 2A-2B respectively illustrate an example environment 200 captured in a first image 202 at time $t_1$ and a second image 204 at a different time $t_2$. The environment 200 may be arranged in accordance with at least one embodiment described in the present disclosure. As illustrated in the first image 202, the player 140, the club 145, a first scan line 205, a second scan line 210, an object 225, and a starting point 235 are depicted with respect to the environment 200. The object 225 and the starting point 235 may be the same as or similar to the object 125 and the starting point 135, respectively, of FIG. 1.

In these or other embodiments, a radar sensor or a motion sensor may detect that the object 225 has been launched due to motion of the object 225 and/or detect that the object 225 will be launched due to motion of the club 145. Based on the detected motion, a computing system (e.g., the computing system 110 of FIG. 1) communicatively coupled to the radar sensor or motion sensor may trigger an identification process of the object 225 in one or more images taken by a camera.

In some embodiments, identification of the object 225 may include identifying pixels that represent at least a portion of the object 225. This may be done in myriad different ways. For example, in one example way using background subtraction methods, pixels representing at least a portion of the object 225 may be searched for and/or identified (e.g., by the data manager 105 of FIG. 1). Background subtraction methods may include any set of techniques that detect changes in data (e.g., scene changes due to changes in pixilation) in reference to a pre-processed image. Some example background subtraction techniques may include a temporal average filter algorithm, a frame differencing algorithm, a mean filter algorithm, a running Gaussian average algorithm, a background mixture algorithm, etc., and any combination thereof. Sample equations and examples of some types of background subtraction methods are discussed in further detail in the paper entitled A COMPREHENSIVE REVIEW OF BACKGROUND SUBTRACTION ALGORITHMS EVALUATED WITH SYNTHETIC AND REAL VIDEOS by Andrews Sobral and Antoine Vacavant of Computer Vision and Image Understanding, Volume 122, May 2014, pages 4-21 (hereafter the Sobral Paper). The contents of the Sobral Paper in its entirety are expressly incorporated by reference into the present disclosure.

Additionally or alternatively, in another example way, pixels representing at least a portion of the object 225 may be searched for and/or identified using a K-nearest neighborhood algorithm. In these or other embodiments, the neural network such as the neural network 115 of FIG. 1 may be implemented in identifying pixels representing at least a portion of the object 225. Sample equations and examples of some types of K-nearest neighborhood algorithms are discussed in further detail in the paper entitled K-Nearest Neighbor Search for Moving Query Point by Zhexuan Song and Nick Roussopoulos as presented in Advances in Spatial and Temporal Databases in the International Symposium on Spatial and Temporal Databases 2001 (hereafter the Song Paper). The contents of the Song Paper in its entirety are expressly incorporated by reference into the present disclosure.

In some embodiments, the identified pixels representing at least a portion of the object 225 may represent a particular aspect or feature of the object 225. For example, the identified pixels may represent markings, shapes, numbers, patterns, a center of gravity, a mid-point, a center line, a stitching, a seam, an air inlet, a letter, etc. of the object 225. In these or other embodiments, the identified pixels representative of a particular aspect or feature of the object 225 may, in turn, be used to identify a position of the object 225 in a respective image. For example, a pixel or group of pixels may correspond to a spin axis of the object 225. Additionally or alternatively, the position (e.g., in the U-V coordinate system) of the spin axis of the object 225 may be designated as the position of the object 225 as a whole. In this manner, a position of the object 225 in one or more images generated by the camera of the sensors 220 may be identified.

In some embodiments, the first image 202 and the second image 204 may be captured via a rolling shutter method. In the rolling shutter method, the environment 200 may not all be captured at a single instant, but may instead be captured portion by portion in chronological sequence, e.g., according to vertical or horizontal segments such as scan lines. In these or other embodiments, the rolling shutter method may help to more accurately determine a time difference between the object 225 positioned at $(U_1, V_1)$ in the first image 202 and the object 225 positioned at $(U_2, V_2)$ in the second image 204 in a U-V coordinate system from a perspective of a camera. For example, in a 1080p image (e.g., 1,920 horizontal pixel lines and 1,080 vertical pixel lines), a time for each scan line in a roller shutter image may be approximately 30 microseconds for a frame rate of 30 fps. The time for each scan line may be determined by dividing the frame rate inverse (e.g., 1 s/30 frames) by the approximate number of scan lines (e.g., about 1080, about 1100, or some other suitable number of scan lines) in an image. Accordingly, the object 225 at $(U_1, V_1)$ in the first image 202 may be associated with the first scan line 205, and the object 225 positioned at $(U_2, V_2)$ in the second image 204 may correspond with the second scan line 210.

Additionally or alternatively, the first scan line 205 and the second scan line 210 may be known, (e.g., the $565^{th}$ scan line for the first scan line 205 and the $623^{rd}$ scan line for the second scan line 210). Thus, in some embodiments, a time difference between the object 225 positioned at $(U_1, V_1)$ in the first image 202 and the object 225 positioned at $(U_2, V_2)$ in the second image 204 may be determined as follows: a time for each scan line multiplied by the number of scan lines between the object 225 positioned at $(U_1, V_1)$ in the first image 202 and the object 225 positioned at $(U_2, V_2)$ in the second image 204. Where, for example, the first image 202 and the second image 204 are consecutive images, the time difference between $(U_1, V_1)$ and $(U_2, V_2)$ in the respective images may be (using the above example numbers) determined according to the expression: $30 \mu s * ((1080-565)+623)$, where the term "30 µs" is the example approximate time for each scan line, the term (1080–565) is the example number of approximate scan lines remaining in the first image 202 after $(U_1, V_1)$, and the term "623" is the example number of approximate scan lines in the second image 204 to reach the position $(U_2, V_2)$. In this example scenario, the time difference between the object 225 positioned at $(U_1, V_1)$ in the first image 202 and the object 225 positioned at $(U_2, V_2)$ in the second image 204 equates to approximately 34 ms. The time difference may be one of the flight parameters 325 input into the data manager 305 to determine one or more aspects of shot data 340 described in conjunction with FIG. 3.

Additionally or alternatively, the time difference between the object 225 positioned at $(U_1, V_1)$ in the first image 202 and the object 225 positioned at $(U_2, V_2)$ in the second image 204 (hereafter "$t_{12}$") may be used to determine a time of impact to the object 225. In these or other embodiments, the time of impact to the object 225 may be another one of the flight parameters 325 input into the data manager 305 to determine one or more aspects of shot data 340 described in conjunction with FIG. 3. In some embodiments, accurately determining the time of impact to the object 225 may, using other methods and systems, be difficult to ascertain because the impact to the object 225 may occur between image frames. However, aspects of the present disclosure address this example difficulty using a cross ratio of perspective projection. The cross ratio of perspective projection may use distances between observed positions of the object 225 (e.g., between $(U_1, V_1)$ and $(U_2, V_2)$), and a time difference between observed positions of the object 225 (e.g., $t_{12}$) to solve for a time difference $t_{01}$ defined as an amount of time between impact to the object 225 and a next observed position of the object 225 at $(U_1, V_1)$. Based on the time difference $t_{01}$, the time at impact to the object 225 may be determined.

In some embodiments, the time difference $t_{01}$ may be solved for according to the following example expression:

$$d_{12}*(d_{01}+d_{12}+d_{23})/[(d_{01}+d_{12})*(d_{12}*d_{23})]=t_{12}*(t_{01}+t_{12}+t_{23})/[(t_{01}+t_{12})*(t_{12}*t_{23})],$$

in which $d_{01}$ may represent a distance from the starting point 235 at $(U_0, V_0)$ to the object 225 at $(U_1, V_1)$; $d_{12}$ may represent a distance from $(U_1, V_1)$ to the object 225 at $(U_2, V_2)$; $d_{23}$ may represent a distance from $(U_2, V_2)$ to the object 225 at a position $(U_3, V_3)$; $t_{01}$ may represent an amount of time between impact to the object 225 at the starting point 235 of $(U_0, V_0)$ and the object 225 positioned at $(U_1, V_1)$; $t_{12}$ may represent an amount of time between the object 225 positioned at $(U_1, V_1)$ and the object 225 positioned at $(U_2, V_2)$; $t_{23}$ may represent an amount of time between the object 225 positioned at $(U_2, V_2)$ and the object 225 positioned at $(U_3, V_3)$; and "*" and "/" may respectively represent scalar multiplication and scalar division operators. In these or other embodiments, one or more of the time differences such as $t_{12}$, $t_{23}$, and up to a $t_{(n-1)n}$ may be determined using the rolling shutter method described above. Additionally or alternatively, $d_{12}$, $d_{23}$, and up to $d_{(n-1)n}$ may be the same or approximately the same distances assuming speed of the object 225 to be constant and the rolling shutter (e.g., frame rate, observation speed, etc.) to be constant.

Figure 2C:
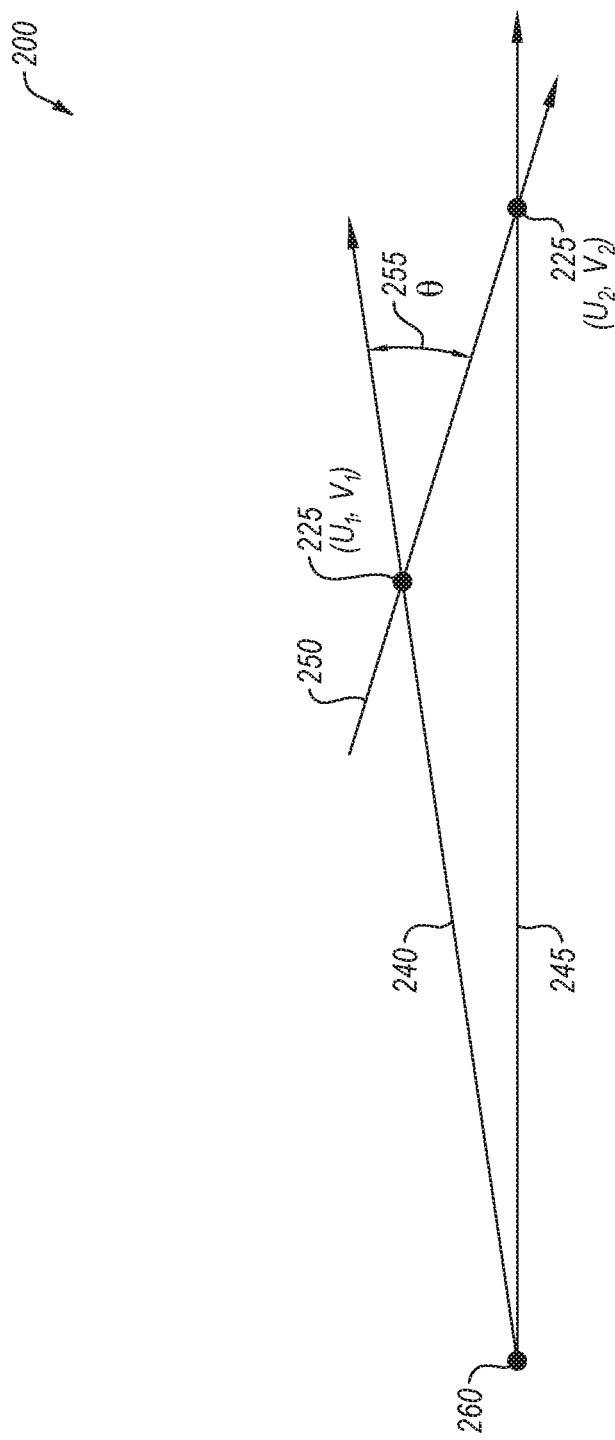
FIG. 2C illustrates an example relationship between observed positions of the object in the environment of FIGS. 2A-2B.

FIG. 2C illustrates an example relationship between observed positions of the object 225 in the environment 200 of FIGS. 2A-2B. The relationship may be arranged in accordance with at least one embodiment described in the present disclosure. As illustrated, the relationship may include the object 225 at $(U_1, V_1)$, the object 225 at $(U_2, V_2)$, a first ray 240, a second ray 245, a flight vector 250, an angle theta 255, and a camera 260.

Figure 3:
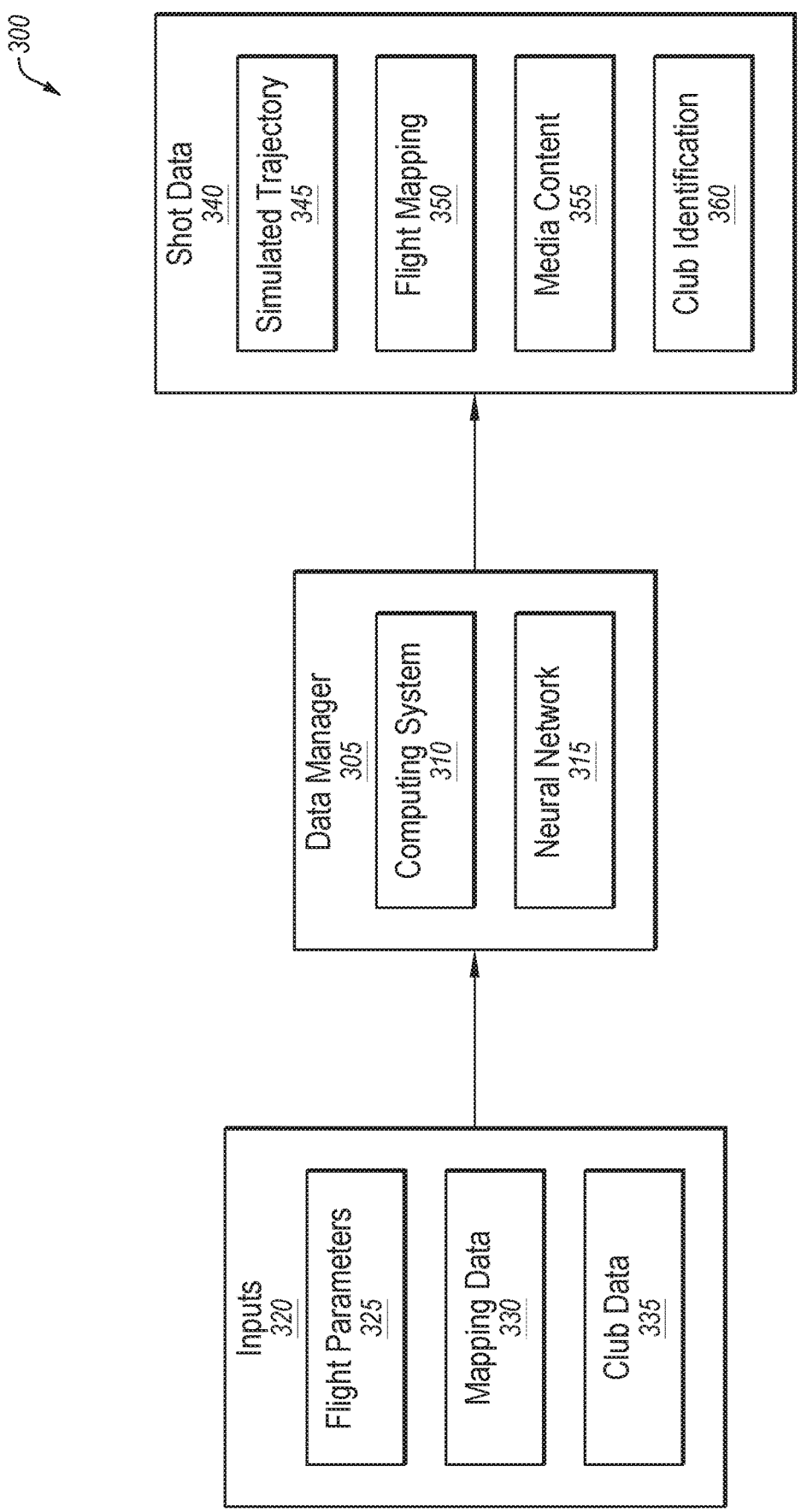
FIG. 3 illustrates an example block diagram having example inputs and outputs related to a launched object.

In some embodiments, the flight vector 250 may be used to determine one or more flight parameters (e.g., the flight parameters 325 of FIG. 3). The flight vector 250 may be determined by connecting in a straight line, the object 225 at $(U_1, V_1)$ and the object 225 at $(U_2, V_2)$. Thus, in some embodiments, the flight vector 250 may be a direction of travel for the object 225 in the U-V coordinate system. In these or other embodiments, the object 225 may be assumed to travel in a straight line between $(U_1, V_1)$ and $(U_2, V_2)$. Additionally or alternatively, the portion of the flight vector 250 between the object 225 at $(U_1, V_1)$ and the object 225 at $(U_2, V_2)$ may be the same length as: another portion of the flight vector 250 between the object 225 at $(U_2, V_2)$ and the object 225 at $(U_3, V_3)$; another portion of the flight vector 250 between the object 225 at $(U_3, V_3)$ and the object 225 at $(U_4, V_4)$; and/or another portion of the flight vector 250 between the object 225 at $(U_{n-1}, V_{n-1})$ and the object 225 at $(U_n, V_n)$. In these or other embodiments, the relationship of the segment lengths of the flight vector 250 between positions of the object 225 may help to analytically determine the angle theta 255 discussed below, for example, to determine a launch angle of the object 225. Additionally or alternatively, a portion of the flight vector 250 may lay in a two-dimensional plane. The two-dimensional plane may include a camera center and the positions ($U_1$, $V_1$) and ($U_2$, $V_2$). In some embodiments, the two-dimensional plane may help to determine the flight vector 225.

To transform the flight vector 250 from the U-V coordinate system to a global coordinate system (e.g., GPS coordinates), the angle theta 255 may be determined. In some embodiments, the angle theta 255 may include an angle at which the flight vector 250 intersects the first ray 240. In other embodiments, the angle theta 255 may include an angle at which the flight vector 250 intersects the second ray 245, or an angle at which the flight vector 250 intersects any other suitable ray (e.g., a third ray) that extends from the camera 260 to an observed position of the object 225 (e.g., ($U_3$, $V_3$)). Thus, in some embodiments, the angle theta 255 may include an angular relationship between the flight vector 250 and any suitable ray from the camera 260.

In some embodiments, the angle theta 255 may be determined analytically (e.g., trigonometry) or via optimization (e.g., Newton's method). As an example of an analytical method, the following expression may help to determine the angle theta 255:

$$[\sin(\theta-\alpha)] \div b = [\sin(\alpha)] \div x_1,$$

in which θ may represent the angle theta 255 to be determined; a may represent an angle formed by the first ray 240 and the second ray 245 relative to the camera 260; b may represent a distance along the first ray 240 from the camera 260 to the observed position ($U_1$, $V_1$); $x_1$ may represent a distance along the flight vector 250 measured between the observed positions ($U_1$, $V_1$) and ($U_2$, $V_2$); and "÷" may represent a scalar division operator. In these or other embodiments, $x_1$ may be the same as or similar to die described above in conjunction with FIGS. 2A-2B. Additionally or alternatively, all variables of the above trigonometric expression may be known or predetermined, except the angle theta 255 that can be solved for using the above example expression. In other embodiments, an example of Newton's optimization method to determine the angle theta 255 may include iteratively finding roots of a differentiable function that approximately describes the flight vector 250, the first ray 240, and the angle theta 255.

In some embodiments, after the angle theta 255 is determined, the flight vector 250 may be transformed into a transformed flight vector having global coordinates by using an accelerometer associated with the camera 260. For example, the accelerometer may indicate a direction of gravity, which may be used as a global coordinate axis or used as a reference to identify one or more global coordinate axes. Thus, in some embodiments, the positional differences between a camera reference frame and the global coordinate system may be quantified with accelerometer data from the accelerometer associated with the camera 260 (e.g., +three degrees offset). Additionally or alternatively, one or more global coordinate axes may correspond to a ground surface, a direction parallel to a surface of the camera 260, or some other suitable reference plane or direction. In these or other embodiments, the transformed flight vector having global coordinates may be a direction of travel for the object 225 in global coordinates (e.g., GPS coordinates or other suitable coordinates).

In some embodiments, the transformed flight vector may be used to determine one or more flight parameters, such as a launch angle and a launch direction of the object 225. The launch angle and the launch direction of the object 225 may be some of the flight parameters 325 discussed below in conjunction with FIG. 3. In these or other embodiments, the launch angle may be determined by continuing along the transformed flight vector in a direction opposite the direction of travel of the object 225 until reaching the ground at the starting point 235. The angle at which the transformed flight vector is positioned relative to the ground may include the launch angle. In some embodiments, the launch angle may describe how the transformed flight vector is positioned in a Y-Z plane, in which +Y is vertically up and +Z is parallel to the ground and directed generally towards a target region such as the target region 137 of FIG. 1.

Additionally or alternatively, the launch direction may be determined by projecting the transformed flight vector onto the ground. The angle at which the projection of the transformed flight vector is positioned relative to a target line (e.g., the +Z axis, a zero degree line directed to the target region 137 of FIG. 1, etc.) may include the launch direction. In some embodiments, the launch direction may describe how the transformed flight vector is positioned in an X-Z plane, in which the X direction is parallel to a front face of the camera 260 and the +Z is parallel to the ground and directed generally towards a target region such as the target region 137 of FIG. 1.

FIG. 3 illustrates an example block diagram 300 having example inputs and outputs related to a launched object. The block diagram 300 may be arranged in accordance with at least one embodiment described in the present disclosure. As illustrated, a data manager 305 may obtain inputs 320 to output shot data 340. In these or other embodiments, the term "obtain" may include generating, acquiring, receiving, determining, calculating, etc. The data manager may include a computing system 310 and a neural network 315, which may be the same as or similar to the system 110 and the neural network 115 described above in conjunction with FIG. 1.

In some embodiments, the inputs 320 may include, for example, flight parameters 325, mapping data 330, and club data 335. The flight parameters 325 may include the launch angle and launch direction described above in conjunction with FIG. 2C. Additionally or alternatively, the flight parameters 325 may include a time difference between observed positions of the object as described above in conjunction with FIGS. 2A-2B. Additionally or alternatively, the flight parameters 325 may include a time of impact to the object as also described above in conjunction with FIGS. 2A-2B.

In some embodiments, another one of the flight parameters 325 may include spin motion data of the object, including rate of spin and direction of spin (e.g., spin axis). In these or other embodiments, determining spin motion of the object may include using markings on the object. The markings may be positioned in predetermined locations on the object, e.g., one hundred twenty degrees relative to each other and spaced equidistant to form a triangle having a center portion that corresponds to a center portion of the object. Other suitable configurations of markings may be employed. In these or other embodiments, when the object is spinning, the markings on the object may form a predetermined blur shape, blur line, or blur pattern based on the configuration of the markings. For example, in the scenario of triangle-shaped markings, a blur line may form due to spin of the object and an exposure duration of a camera observing the object.

Additionally or alternatively, the blur line may help to identify the spin axis and/or spin rate. For example, a 1500 RPM rotation of the object may be predetermined as configured to induce a blur line of approximately nine degrees offset from a spin axis. Other RPMs of the object may be predetermined as configured to induce a blur line of about two degrees, about four degrees, about twelve degrees, about twenty five degrees, about fifty degrees, about ninety degrees, about one hundred twenty degrees, etc. offset from the spin axis. Thus, in some embodiments, predetermined relationships between spin rate (e.g., RPM) and observed positioning of the spin axis may be used to approximate the spin rate of the object. Additionally or alternatively, the blur line may of itself indicate the actual spin axis of the object. In these or other embodiments, identification of the spin axis may include identification of the direction of spin (e.g., clockwise or counter-clockwise about the spin axis). For example, the manner in which the spin axis is positioned or shaped may indicate which direction the object is spinning.

In some embodiments, motion blur may also be observed as a result of linear motion of the object, and not as a result of rotational motion or spin. However, the motion blur and rotational blur may fuse together when observed, appearing inseparable or indistinguishable. In these or other embodiments, the motion blur and the rotational blur may be separated to help increase accuracy of one or more of the flight parameters 325 such as the spin rate and the spin axis. Separating the two different kinds of blurs may be done in myriad different ways. In one example way, a point spread function may be used in deconvolution of blur. Sample equations and examples of some point spread functions used in deconvolution processes relating to motion blur are described in additional detail in the paper entitled IMAGE MOTION DEBLURRING by Daniel Cunningham archived at http://homepages.inf.ed.ac.uk/rbf/CVonline/LOCAL_COPIES/AV0506/s0198594.pdf (hereafter "Cunningham Paper"). The contents of the Cunningham Paper in its entirety are expressly incorporated by reference into the present disclosure.

In some embodiments, the flight parameters 325 may include a speed of the object. For example, a radar sensor may generate radar data of the object after the object is launched. Additionally or alternatively, the radar data may be analyzed to ascertain a measured speed of the object. Analysis of the radar data may include myriad different ways of analysis. In one example way of analysis, a Fast Fourier transform (FFT) may be performed on the radar data, e.g., by the computing system 310. In these or other embodiments, the analysis may be performed on the radar data corresponding to a time around launch of the object (e.g., around time $t_{01}$ described above in conjunction with FIGS. 2A-2B). In an example analysis including an FFT, the FFT may include a Cooley-Tukey FFT, a Prime-factor FFT, a Bruun's FFT, a Rader's FFT, a Bluestein's FFT, a Goertzel algorithm, a Radix algorithm, a Fast Hartley Transform, a Quick Fourier Transform, a Decimation-in-Time-Frequency algorithm, a combination thereof, or any other suitable algorithm. Sample equations and examples of some types of FFT analysis are described in additional detail in the paper entitled FFT ALGORITHMS by Brian Gough dated May 1997 and archived at https://pdfs.semanticscholar.org/ca1c/a09567ef927c6b545af435f96e9e49ba43ee.pdf (hereafter the "Gough Paper"). The contents of the Gough Paper in its entirety are expressly incorporated by reference into the present disclosure.

In these or other embodiments, the analysis on the radar data may output a measured speed of the object. The measured speed of the object, in some cases, may include a fraction of the actual speed of the object since the radar sensor may measure the portion of the speed of the object in the radial direction of the radar sensor, not the actual speed of the object along its trajectory. Thus, in some embodiments, the actual speed of the object may be found by dividing the measured speed of the object by the cosine of the angle theta 255 described above in conjunction with FIG. 2C. The actual speed of the object may be one of the flight parameters 325.

In some embodiments, the mapping data 330 may include a satellite image or a flyby image. The satellite image or flyby image may be obtained via one or more service providers such as Google® Maps, Google® Earth, Apple® Maps, etc. Additionally or alternatively, the mapping data 330 may include GPS coordinates or other suitable positioning data. The GPS coordinates may correspond to a client device, a sensor (such as one of the sensors 220 of FIG. 2), a measuring device, or any other suitable device. In these or other embodiments, the GPS coordinates may be associated with a location of the object, for example, due to proximity to the object. Additionally or alternatively, the GPS coordinates may correspond to the object itself, for example, due to a GPS chip on or within the object that is configured to relay GPS data to the computing system 310 and/or permit acquisition of GPS data by the computing system 310 (e.g., via a wireless connection such as a BlueTooth® connection).

In some embodiments, the club data 335 may include motion data. The motion data may include radar data, motion sensor data, and/or other suitable data configured to indicate motion. In these or other embodiments, the motion data may trigger a club recognition mode (e.g., of the computing system 310). For example, upon receiving the motion data at the computing system 310, the computing system 310 may cause a camera communicatively coupled thereto to obtain additional club data 335 in the form of one or more images. Additionally or alternatively, upon receiving the motion data at the computing system 310, the computing system 310 may analyze one or more images in an image buffer. The image buffer may be configured as data storage (e.g., as part of the computing system 310) that may receive data on a rolling basis and/or may delete data on a rolling basis as the image buffer satisfies a data threshold.

As described above, the inputs 320 may include the flight parameters 325, the mapping data 330, and the club data 335. The data manager 305 may process one or more of the inputs 320 to output one or more aspects of the shot data 340. In some embodiments, the shot data 340 may include a simulated trajectory 345, flight mapping 350, media content 355, and club identification 360.

In some embodiments, the simulated trajectory 345 may be the same as or similar to the trajectory 130 described above in conjunction with FIG. 1. The simulated trajectory 345 may be determined by the data manager 305 in myriad different ways. In one example way, an ordinary differential equation (ODE) may be used to determine the simulated trajectory 345. For example, one or more of the flight parameters 325 may be input into the ODE to output the simulated trajectory 345, the expression of which is as follows: simulated trajectory 345=f(flight parameters 325), where the term f( ) may represent the ODE. In some embodiments, solving the ODE may include iterative solutions that may represent positions of the object at example time steps of $\Delta t$. In psuedo-equation form of an example ODE, a first position of the object may be determined. Afterwards, a second position of the object at time $\Delta t$ later may be determined, by multiplying the speed of the object at the previous position (e.g., the first position) by time $\Delta t$. Additionally or alternatively, the speed of the object at any given position may be updated. For example, the speed of the object at the second position may be determined by multiplying adjusted spin data of the object by time $\Delta t$. In these or other embodiments, the adjusted spin data may be based on spin data of the previous position (e.g., the first position). Thus, in some embodiments, the computing system 310 may iteratively execute the ODE to determine positions of the object at example time steps of Δt to determine the simulated trajectory 345.

Additionally or alternatively, any of the flight parameters 325 may be determined for a first time and/or updated as the simulated trajectory 345 is modeled. For example, not all of the flight parameters 325 may be used as an input 320. Rather, some of the flight parameters 325 may be considered as outputs and may be determined as the simulated trajectory 345 is modeled. For example, one or more of the flight parameters 325 may be determined using an ordinary differential equation (ODE). In some embodiments, solving the ODE may include iterative solutions that may represent spin rate and/or speed of the object at example time steps of Δt. In psuedo-equation form of an example ODE, a first position of the object may be obtained. Afterwards, a second position of the object at time Δt later may be obtained. Given a time step of time Δt and the positional difference between the first position and the second position, the speed of the object may be determined. Additionally or alternatively, the speed of the object at any given position may be updated. For example, the speed of the object at the second position may be determined by multiplying adjusted spin data of the object by time Δt. In these or other embodiments, the adjusted spin data may be based on spin data of the previous position (e.g., the first position) or any other flight parameter 325. Thus, in some embodiments, the computing system 310 may iteratively execute the ODE to determine and/or update flight parameters 325 like speed and spin rate of the object at example time steps of Δt in the simulated trajectory 345 described further below.

In some embodiments, the simulated trajectory 345 may be in global, three-dimensional coordinates such as GPS coordinates after being determined by the data manager 305. To output the simulated trajectory 345 on a display, the simulated trajectory 345 may be transformed for presentation at a two-dimensional image plane of the display. An example of the display may include a graphical user interface communicatively coupled to the computing system 310. In these or other embodiments, converting the simulated trajectory 345 may include use of a perspective projection matrix such as a 3×4 matrix (hereafter PPM).

In some embodiments, The PPM may include a K-matrix multiplied by an RT-matrix. The K-matrix may include a 3×3 matrix that includes intrinsic parameters of a camera communicatively coupled to the computing system 310. Examples of intrinsic parameters may include image plane coordinates (e.g., U-V coordinates) of the camera reference frame, pixel coordinates, and any other suitable parameters that may be used to link pixel coordinates of an image point with corresponding coordinates in a camera reference frame. The RT-matrix may include the combination of an R-matrix (e.g., a 3×3 rotational matrix), and a T-matrix that is a unitary matrix, such as a 3×1 zero matrix. Thus, in some embodiments, the RT-matrix may include a 3×4 matrix. In these or other embodiments, an example result of multiplying a matrix, such as the K-matrix, by the RT-matrix is transformation of the camera coordinate frame to a global coordinate frame.

In some embodiments, the PPM may be multiplied by the simulated trajectory 345, which may be represented by a 4×n matrix, in which the term "n" is the number of points in the simulated trajectory 345. The resulting cross product of the PPM and the simulated trajectory 345 may include a converted version of the simulated trajectory 345 described in homogeneous coordinates. The homogeneous coordinates may help to accurately represent three-dimensional information in a two-dimensional image plane of the display, at which a version of the simulated trajectory 345 may be presented.

In some embodiments, error may be introduced when converting the simulated trajectory 345 into the converted version of the simulated trajectory 345. The error may be described as a cost function in which differences between the simulated trajectory 345 and the converted version of the simulated trajectory 345 may be given quantitative values. In these or other embodiments, the cost function may be optimized to help provide an improved or more accurate converted version of the simulated trajectory 345. Additionally or alternatively, optimization of the cost function may include assuming one or more of the flight parameters 325 as constant or fixed over a given period of time, e.g., for reducing error. As used herein, the term "optimize" should be interpreted to mean "improved," "enhanced" or "local optima," and not necessarily as "absolute optima," "true optimization" or the "best," although an "absolute optima" or "best" may still be covered by the present disclosure. For example, an optimization process may improve upon a solution that was there previously, may find the best solution, or may verify that an existing solution is a "local optima" or an "absolute optima" and thus should not be modified or changed.

In some embodiments, the flight mapping 350 may include the satellite image or flyby image of the environment onto which the simulated trajectory 345 may be superimposed. Additionally or alternatively, the flight mapping 350 may include a target line superimposed onto the satellite image or flyby image of the environment. The target line may be generated based on compass data (e.g., of a client device pointed generally in the direction of the launch of the object). In these or other embodiments, the compass data may not perfectly align the object at rest (pre-launch) with a desired target region at which a player intends to place the object. In these or other embodiments, the target region may be selected by the user via a user interface (e.g., of the computing system 310 of a client device or other suitable device). The target region may be associated with GPS coordinates, and based on the target region coordinates, the target line may be adjusted. For example, given a set of GPS coordinates for a particular target region, a client device may initially provide compass data that is offset from the target region. Then the computing system 310 may cause the client device to automatically update the target line to align with the actual position of the target region based on the associated GPS coordinates. In these or other embodiments, the flight mapping 350 may be presented at a display, for example, along with media content 355 described below.

The media content 355 may include one or more of: an image, a video, replay content, previous player content, multi-player content, single player content, interactive content, entertainment, betting or gambling content, competition content, shot statistics, position data, target region data, environment data, the simulated trajectory 345, the flight mapping 350, and the club identification 360 described below. In these or other embodiments, the media content 355 may be presented at a display of the computing system 310. The display may be part of or communicatively coupled to a client device, a third-party device, a measuring device, a device proximate to an object launch area, a network-connected device, or any other suitable device.

The club identification 360 may include an identified club and any associated data related thereto. In these or other embodiments, the club identification 360 may be determined using image processing and image recognition techniques. In an example scenario, upon receiving the club data 335 at the computing system 310, the computing system 310 may cause a camera communicatively coupled thereto to obtain additional club data 335 in the form of one or more images. Additionally or alternatively, using an object detection network such as, for example, a Single Shot Detector (SSD), the club and an associated club identifier may be located. The object detection network may, using one or more of the images, determine a type of club (e.g., wood, iron, hybrid). Additionally or alternatively, one or more images of the club may be provided to the neural network 315. The neural network 315 may, using techniques described in conjunction with the neural network 115 of FIG. 1, identify the type of club and/or the club identifier. The club identifier may include a number or name, a shape, an outline, a material, an amount of reflectivity, a shaft, a face angle, a head measurement, etc. that may help the data manager 305 to identify the club and output the club identification 360.

Figure 4:
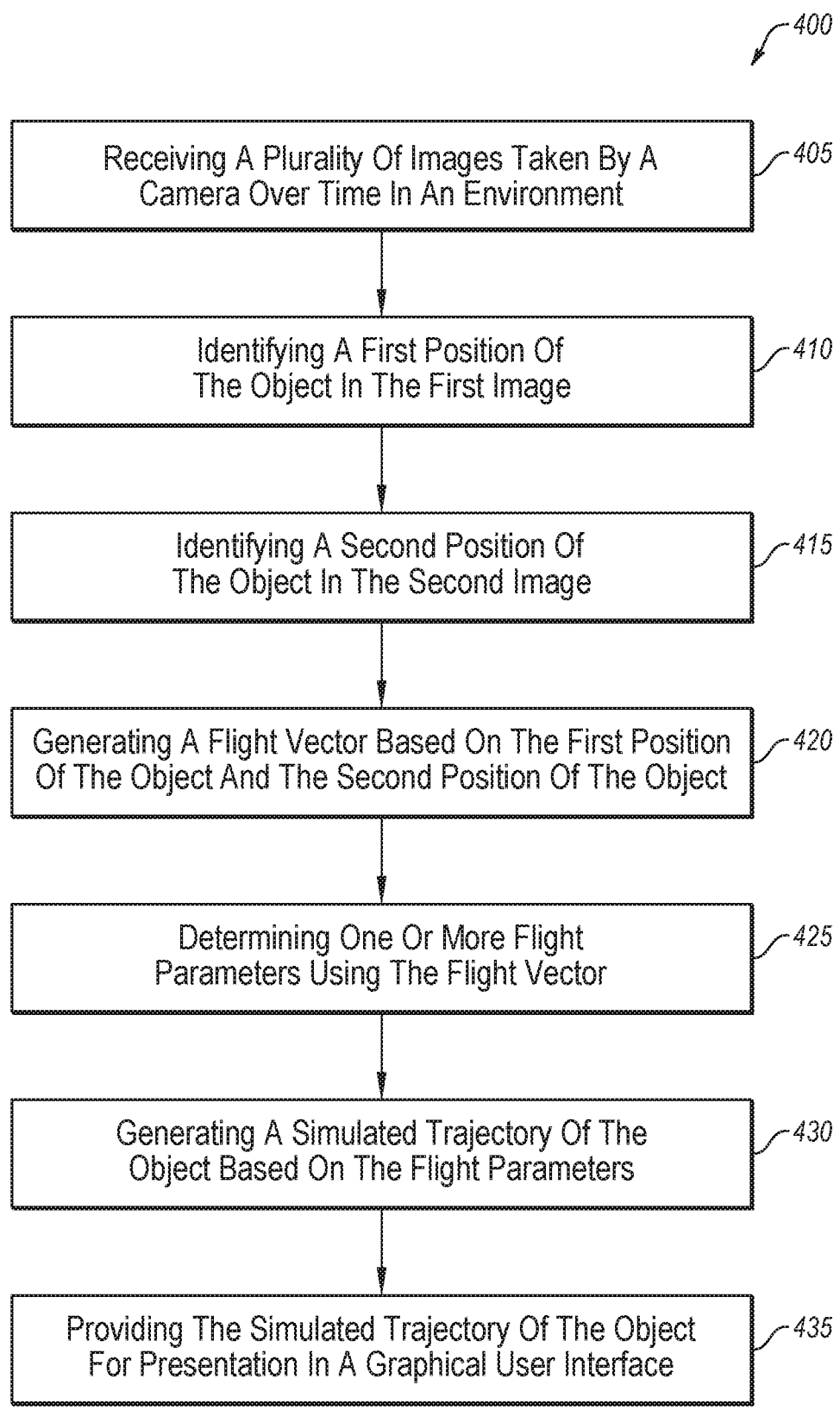
FIG. 4 illustrates an example method to simulate a trajectory of an object.

FIG. 4 illustrates an example method 400 to simulate a trajectory of an object. The method 400 may be performed according to one or more embodiments described in the present disclosure. In these or other embodiments, the method 400 may be performed by processing logic that may include hardware (circuitry, dedicated logic, etc.), software (such as is run on a computer system), or a combination of both, which processing logic may be included in a client device, or another computer system or device. However, another system, or combination of systems, may be used to perform the method 400. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 400 may begin at block 405, where a group of images taken by a camera over time in an environment may be received. In some embodiments, the camera may be oriented within the environment to capture images in a substantially same direction as a launch direction of the object. At block 410, a first position of the object in the first image may be identified. At block 415, a second position of the object in the second image may be identified. In some embodiments, motion data of the object received from a motion sensor or radar sensor may trigger the identifying of the object in buffered images of the first image and the second image. At block 420, a flight vector based on the first position of the object and the second position of the object may be generated. In some embodiments, the flight vector may include a connecting line between the object in the first position and the object in the second position.

At block 425, one or more flight parameters may be determined using the flight vector. In some embodiments, determining one or more flight parameters using the flight vector may include determining a launch angle and the launch direction of the object by: generating a first ray from the camera to the object in the first image; generating a second ray from the camera to the object in the second image; generating the flight vector by creating a line intersecting both the first ray and the second ray at the object in the first image and the second image, respectively; and/or determining a transformed flight vector relative to the camera to be relative to a Global Positioning System (GPS) coordinate system by determining an angle theta at which the flight vector intersects the first ray, the transformed flight vector being a direction of travel for the object. In some embodiments, the one or more flight parameters include an actual speed of the object. Additionally or alternatively, a radar speed of the object may be determined using a Fast Fourier Transform of radar data of the object. Additionally or alternatively, the actual speed of the object may be determined by dividing the radar speed of the object by a cosine of the angle theta.

In some embodiments, at block 425, one or more additional flight parameters based on rotational blur of the object in the first and second images, including a spin rate and a spin axis for the object, may be determined. In these or other embodiments, the object may include predetermined markings arranged such that the spin rate and the spin axis of the object are determined based on a manner in which the predetermined markings are captured by the camera in the first image and the second image due to the rotational blur of the object in the first image and the second image.

At block 430, a simulated trajectory of the object may be generated based on the flight parameters determined at block 425. In some embodiments, as the simulated trajectory of the object is generated, one or more flight parameters not determined at block 425 may be determined. At block 435, the simulated trajectory of the object may be provided for presentation in a graphical user interface of a display. In some embodiments, providing the simulated trajectory of the object for presentation in the graphical user interface may include: converting the simulated trajectory into a two-dimensional image plane; superimposing the converted simulated trajectory onto a satellite image or a flyby image of the environment; and/or presenting a video of the object being launched and flight data of the object.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, another block in the method 400 may include determining a first moment in time associated with the object in the first image and a second moment in time associated with the object in the second image using a rolling shutter of the camera. In another example, a block in the method 400 may include determining an impact time at which the object is impacted based on the first moment in time and the first position associated with the object in the first image and based on the second moment in time and the second position associated with the object in the second image. In another example, a block in the method 400 may include automatically identifying a club associated with the simulated trajectory of the object using a neural network to identify a club identifier of the club captured in one or more images of the plurality of images.

FIG. 5 illustrates an example system 500 that may be used to simulate a trajectory of an object. The system 500 may be arranged in accordance with at least one embodiment described in the present disclosure. The system 500 may include a processor 510, memory 512, a communication unit 516, a display 518, a user interface unit 520, and a peripheral device 522, which all may be communicatively coupled. In some embodiments, the system 500 may be part of any of the systems or devices described in this disclosure. For example, the system 500 may be part of the data manager 105 of FIG. 1. Additionally or alternatively, the system 500 may be part of the computing system 110 and/or the neural network 115.

Generally, the processor 510 may include any computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described in this disclosure. In some embodiments, the processor 510 may interpret and/or execute program instructions and/or process data stored in the memory 512. In some embodiments, the processor 510 may execute the program instructions stored in the memory 512.

For example, in some embodiments, the processor 510 may execute program instructions stored in the memory 512 that are related to, for example, simulating a trajectory of an object such that the system 500 may perform or direct the performance of the operations associated therewith as directed by the instructions. In these and other embodiments, instructions may be used to perform one or more operations of the method 400 of FIG. 4 described above.

The memory 512 may include computer-readable storage media or one or more computer-readable storage mediums for carrying or having computer-executable instructions or data structures stored thereon. Such computer-readable storage media may be any available media that may be accessed by a computer, such as the processor 510. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media. Computer-executable instructions may include, for example, instructions and data configured to cause the processor 510 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuuten, 500 F.3d 1346 (Fed. Cir. 2007). Combinations of the above may also be included within the scope of computer-readable media.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 516 may permit data to be exchanged with a network and/or any other devices or systems described in the present disclosure.

The display 518 may be configured as one or more displays, like an LCD, LED, a monitor, a screen, or other type of display. The display 518 may be configured to output shot data such as a simulated trajectory of an object, flight mapping, media content, and club identification; a schematic or representation of an environment in which the object traveled at some point during the trajectory, user interfaces, and other data as directed by the processor 510.

The user interface unit 520 may include any device to allow a user to interface with the system 500. For example, the user interface unit 520 may include a mouse, a track pad, a keyboard, buttons, and/or a touchscreen, among other devices. The user interface unit 520 may receive input from a user and provide the input to the processor 510. In some embodiments, the user interface unit 520 and the display 518 may be combined. For example, a player may select, via the user interface unit 520, a target region at which placement of the object is desired.

The peripheral devices 522 may include one or more devices. For example, the peripheral devices may include a sensor, a microphone, and/or a speaker, among other peripheral devices. In these and other embodiments, the microphone may be configured to capture audio. The speaker may broadcast audio received by the system 500 or otherwise generated by the system 500. The sensor may be configured to sense changes in in light, pixels, sound, motion, rotation, position, orientation, magnetization, acceleration, tilt, vibration, force, speed, color, wind, etc.

Modifications, additions, or omissions may be made to the system 500 without departing from the scope of the present disclosure. For example, in some embodiments, the system 500 may include any number of other components that may not be explicitly illustrated or described. Further, depending on certain implementations, the system 500 may not include one or more of the components illustrated and described.

As indicated above, the embodiments described herein may include the use of a computer (e.g., a processor element) including various computer hardware or software modules. Further, as indicated above, embodiments described herein may be implemented using computer-readable media (e.g., a memory element) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    receiving a plurality of images taken by a camera over time in an environment, the camera oriented within the environment to capture images of an object in a substantially same direction as a launch direction of the object, the plurality of images including a first image and a second image;
    identifying a first position of the object in the first image;
    identifying a second position of the object in the second image;
    generating a flight vector based on the first position of the object and the second position of the object;
    determining one or more flight parameters using the flight vector;
    generating a simulated trajectory of the object based on the flight parameters; and
    providing the simulated trajectory of the object for presentation in a graphical user interface.

2. The method of claim 1, wherein motion data of the object received from a motion sensor or radar sensor triggers the identifying of the object in buffered images of the first image and the second image.

3. The method of claim 1, further comprising determining one or more additional flight parameters based on rotational blur of the object in the first image and the second image, the one or more additional flight parameters including a spin rate for the object and a spin axis for the object,
    wherein the object includes predetermined markings arranged such that the spin rate and the spin axis of the object are determined based on a manner in which the predetermined markings are captured by the camera in the first image and the second image due to the rotational blur of the object in the first image and the second image.

4. The method of claim 1, further comprising determining a first moment in time associated with the object in the first image and a second moment in time associated with the object in the second image using a rolling shutter of the camera.

5. The method of claim 4, further comprising determining an impact time at which the object is impacted based on the first moment in time and the first position associated with the object in the first image and based on the second moment in time and the second position associated with the object in the second image.

6. The method of claim 1, wherein determining one or more flight parameters using the flight vector includes determining a launch angle and the launch direction of the object by:
   generating a first ray from the camera to the object in the first image;
   generating a second ray from the camera to the object in the second image;
   generating the flight vector by creating a line intersecting both the first ray and the second ray at the object in the first image and the second image, respectively; and
   determining a transformed flight vector relative to the camera to be relative to a Global Positioning System (GPS) coordinate system by determining an angle theta at which the flight vector intersects the first ray, the transformed flight vector being a direction of travel for the object.

7. The method of claim 6, further comprising:
   determining a radar speed of the object using a Fast Fourier Transform of radar data of the object; and
   determining the actual speed of the object by dividing the radar speed of the object by a cosine of the angle theta, wherein the one or more flight parameters include the actual speed of the object.

8. The method of claim 1, wherein providing the simulated trajectory of the object for presentation in the graphical user interface includes:
   converting the simulated trajectory into a two-dimensional image plane;
   superimposing the converted simulated trajectory onto a satellite image or a flyby image of the environment; and
   presenting a video of the object being launched and flight data of the object.

9. The method of claim 1, further comprising automatically identifying a club associated with the simulated trajectory of the object using a neural network to identify a club identifier of the club captured in one or more images of the plurality of images.

10. A system, comprising:
    one or more processors; and
    non-transitory computer readable media that include instructions thereon that, in response to execution by the one or more processors, control performance of operations comprising:
      receive a plurality of images taken by a camera over time in an environment, the camera oriented within the environment to capture images of an object in a substantially same direction as a launch direction of the object, the plurality of images including a first image and a second image;
      identify a first position of the object in the first image;
      identify a second position of the object in the second image;
      generate a flight vector based on the first position of the object and the second position of the object;
      determine one or more flight parameters using the flight vector;
      generate a simulated trajectory of the object based on the flight parameters; and
      provide the simulated trajectory of the object for presentation in a graphical user interface.

11. The system of claim 10, wherein motion data of the object received from a motion sensor or radar sensor triggers the operation to identify the object in buffered images of the first image and the second image.

12. The system of claim 10, wherein the operations further comprise determining one or more additional flight parameters based on rotational blur of the object in the first image and the second image, the one or more additional flight parameters including a spin rate for the object and a spin axis for the object,
    wherein the object includes predetermined markings arranged such that the spin rate and the spin axis of the object are determined based on a manner in which the predetermined markings are captured by the camera in the first image and the second image due to the rotational blur of the object in the first image and the second image.

13. The system of claim 10, wherein the operations further comprise determining a first moment in time associated with the object in the first image and a second moment in time associated with the object in the second image using a rolling shutter of the camera.

14. The system of claim 13, wherein the operations further comprise determining an impact time at which the object is impacted based on the first moment in time and the first position associated with the object in the first image and based on the second moment in time and the second position associated with the object in the second image.

15. The system of claim 10, wherein the operation to determine one or more flight parameters using the flight vector includes determining a launch angle and the launch direction of the object by operations of:
    generate a first ray from the camera to the object in the first image;
    generate a second ray from the camera to the object in the second image;
    generate the flight vector by creating a line intersecting both the first ray and the second ray at the object in the first image and the second image, respectively; and
    determine a transformed flight vector relative to the camera to be relative to a Global Positioning System (GPS) coordinate system by determining an angle theta at which the flight vector intersects the first ray, the transformed flight vector being a direction of travel for the object.

16. The system of claim 15, further comprising operations of:
    determine a radar speed of the object using a Fast Fourier Transform of radar data of the object; and
    determine the actual speed of the object by dividing the radar speed of the object by a cosine of the angle theta, wherein the one or more flight parameters include the actual speed of the object.

17. The system of claim 10, wherein the operation to provide the simulated trajectory of the object for presentation in the graphical user interface includes operations of:
    convert the simulated trajectory into a two-dimensional image plane;
    superimpose the converted simulated trajectory onto a satellite image or a flyby image of the environment; and
    present a video of the object being launched and flight data of the object.

18. The system of claim 10, wherein operations further comprise automatically identifying a club associated with the simulated trajectory of the object using a neural network to identify a club identifier of the club captured in one or more images of the plurality of images.

19. A measurement device, comprising:
    one or more processors; and non-transitory computer readable media that include instructions thereon that, in response to execution by the one or more processors, control performance of operations comprising:
  receive a plurality of images from a client device communicatively coupled to the measurement device, the client device oriented within an environment to capture images of an object in a substantially same direction as a launch direction of the object, the plurality of images including a first image and a second image;
  identify a first position of the object in the first image;
  identify a second position of the object in the second image;
  generate a flight vector based on the first position of the object and the second position of the object;
  determine one or more flight parameters using the flight vector;
  generate a simulated trajectory of the object based on the flight parameters; and
  provide the simulated trajectory of the object for presentation in a graphical user interface.

20. The measurement device of claim 19, wherein the operation to determine one or more flight parameters using the flight vector includes determining a launch angle and the launch direction of the object by operations of:
  generate a first ray from the client device to the object in the first image;
  generate a second ray from the client device to the object in the second image;
  generate the flight vector by creating a line intersecting both the first ray and the second ray at the object in the first image and the second image, respectively; and
  determine a transformed flight vector relative to the client device to be relative to a Global Positioning System (GPS) coordinate system by determining an angle theta at which the flight vector intersects the first ray, the transformed flight vector being a direction of travel for the object.

* * * * *

UNITED STATES PATENT AND TRADEMARK OFFICE
CERTIFICATE OF CORRECTION

PATENT NO. : 10,835,803 B2
APPLICATION NO. : 16/357079
DATED : November 17, 2020
INVENTOR(S) : Batuhan Okur et al.

It is certified that error appears in the above-identified patent and that said Letters Patent is hereby corrected as shown below:

In the Specification

Column 8, Lines 14 and 15 should read:
$d_{12}*(d_{01}+d_{12}+d_{23})/[(d_{01}+d_{12})*(d_{12}+d_{23})] = t_{12}*(t_{01}+t_{12}+t_{23})/[(t_{01}+t_{12})*(t_{12}+t_{23})],$ Signed and Sealed this
Twelfth Day of November, 2024

Katherine Kelly Vidal
*Director of the United States Patent and Trademark Office*